Patented May 14, 1940

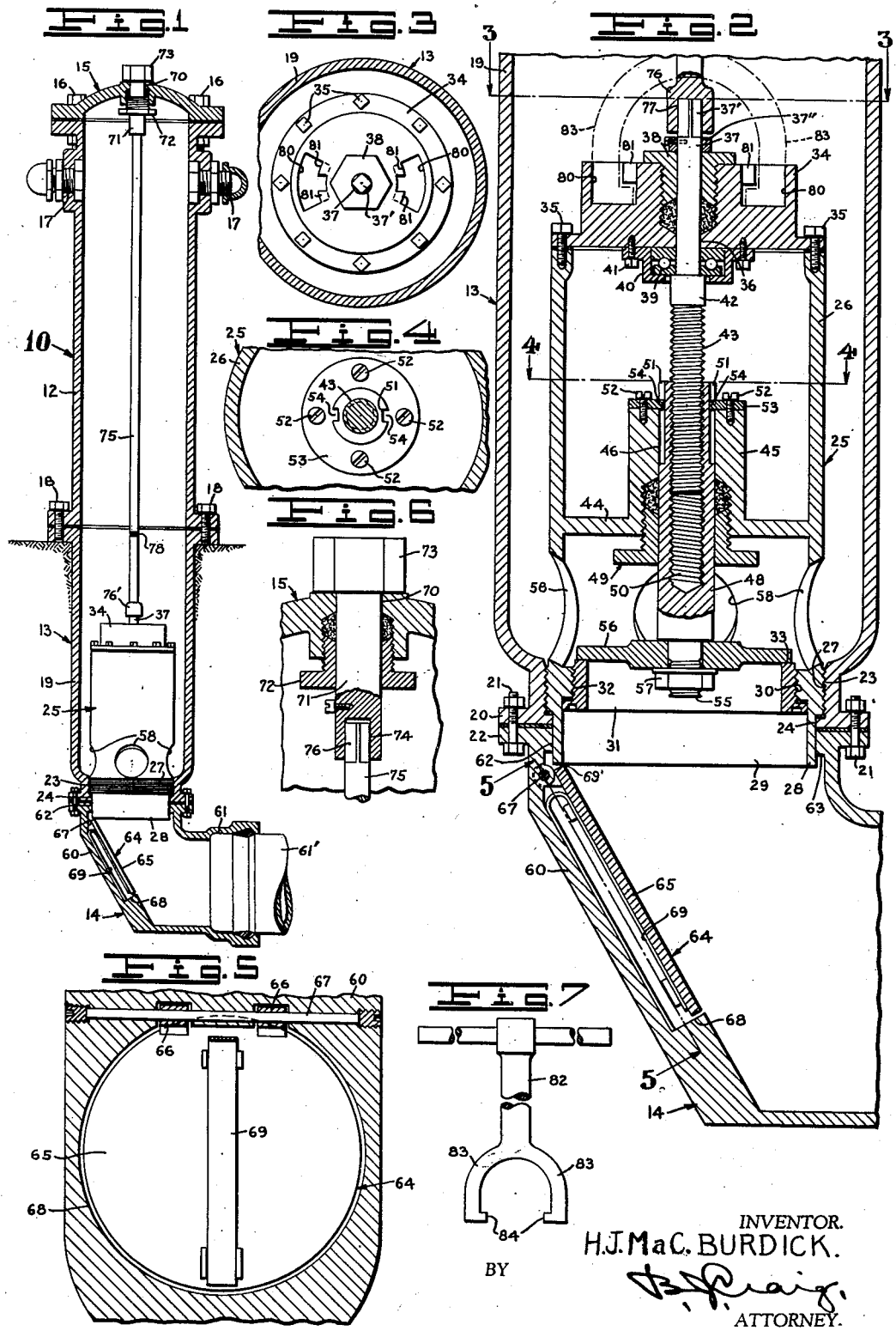

2,200,770

UNITED STATES PATENT OFFICE 2,200,770

FIRE HYDRANT

Harry J. McCombs Burdick, Anaheim, Calif.

Application January 22, 1937, Serial No. 121,788

9 Claims. (Cl. 137—13)

This invention relates to improvements in fire hydrants.

The general object of this invention is to provide an improved fire hydrant including novel shut off means.

Another object of the invention is to provide novel control valve for a fire hydrant.

Other objects and the advantages of this invention will be apparent from the following description taken in connection with the accompanying drawing, wherein:

Fig. 1 is a central, vertical section through my improved fire hydrant showing the control valve mechanism in elevation;

Fig. 2 is an enlarged fragmentary section similar to Fig. 1 showing the control valve mechanism in section;

Fig. 3 is a fragmentary section taken on line 3—3 of Fig. 2;

Fig. 4 is a fragmentary section taken on line 4—4 of Fig. 2;

Fig. 5 is a fragmentary section taken on line 5—5 of Fig. 2;

Fig. 6 is a fragmentary enlarged section through the hydrant cap showing details of the control stem; and Fig. 7 is a side elevation of a wrench for use with my valve mechanism.

Referring to the drawing by reference characters I have indicated my improved fire hydrant generally at 10. As shown the hydrant 10 includes an upper portion 12, an intermediate portion 13 and a lower portion 14. The upper portion 12 is shown as provided with a cap 15 which is secured thereto by bolts 16.

Below the cap 15 the portion 12 includes suitable outlet members 17 and adjacent the lower end is secured to the intermediate portion 13 by bolts 18. As shown the intermediate portion 13 comprises a cylindrical body portion 19, the lower end of which is provided with a flange 20 which is secured by bolts 21 to a similar flange 22 on the lower portion 14. Adjacent the lower end the body includes a reduced threaded aperture 23 and a reduced aperture 24.

Positioned in the body 19 I provide a valve mechanism which is indicated generally at 25. As shown the valve mechanism 25 includes a hollow, cylindrical housing member 26 the lower end of which is threaded as at 27 to match the threads 23 of the body 19. Below the threads 27 the housing 26 includes a reduced portion 28 having a recess 29 therein which communicates with a reduced threaded aperture 30. Positioned in the recess 29 I provide a valve seat member 31 which is threaded as at 32 to engage the threads 30 of the housing 26.

The upper end of the valve seat member 31 forms a seat portion as indicated at 33. The housing 26 has a cap member 34 secured to the upper end thereof by bolts 35. The cap 34 has an aperture 36 therein in which a control rod 37 is positioned. The upper end of the rod 37 includes a square wrench engaging portion 37'. Removably mounted on the rod 37 above the packing gland 38 I provide a collar 37" which prevents the rod 37 from moving downward when the device is operated. The cap 34 is provided with a suitable packing gland 38 surrounding the rod 37. On the under side of the cap 34 I provide an anti-friction thrust bearing 39 which is mounted in a housing 40 which is secured to the cap 36 by bolts 41. Below the anti-friction bearing 39 the rod includes an enlarged section 42 which engages one race of the anti-friction bearing and below the section 42 the rod 37 is threaded as at 43.

Intermediate the valve seat member 31 and the cap 34 the housing 26 has a transverse partition 44 therein having a central boss 45 thereon. The boss 45 has an aperture 46 therein in which a stem member 48 is positioned. In the lower portion the boss includes a suitable packing gland 49 which surrounds the stem 48. The stem 48 has a threaded recess 50 therein in which the threaded portion 43 of the rod 37 is positioned.

Adjacent its upper end the stem 48 has a pair of opposed vertical key slots 51 therein. Secured to the top of the boss 45 by bolts 52 I provide a key washer 53 which includes a pair of opposed lip portions 54 which are positioned in the key slots 51 of the stem 48 to prevent the stem 48 from rotating. The lower end of the stem 48 includes a reduced threaded portion 55 in which a flat valve member 56 is positioned and secured to the stem by a nut 57 positioned on the threaded portion 55. In the side walls of the housing 27 intermediate the partition 44 and the threaded portion 27 I provide a plurality of outlet apertures 58.

The lower member 14 includes an inlet aperture 61 and an outlet aperture 62 which communicates with the aperture 24 of the housing 26. The inlet aperture 61 communicates with a suitable water pipe 61' which in turn communicates with a suitable source of water supply (not shown). Surrounding the outlet aperture 62 I provide a valve seat portion 63 which at certain times is adapted to be engaged by a valve member 64.

As shown the valve member 64 comprises a flat valve plate 65 having hinge lugs 66 thereon which are pivotally mounted on a rod 67 mounted in the body portion 60. The valve plate 65 is positioned in a suitable recess 68 in the body 60 and between the bottom of the recess 68 of the adjacent face of the valve plate 65 I may provide a flat U-shaped spring member 69 one part of which engages the valve plate 65 and the other part engages the bottom of the recess 68. The upper part of the valve plate 65 normally engages the lower portion 28 of the housing 26 as at 69' to prevent closing of the valve plate 65.

As shown in Fig. 6 the cap 15 has a central aperture 70 therein in which a rod 71 is positioned. The cap 15 furthermore includes a suitable packing gland 72 which surrounds the rod 71. The upper end of the rod 71 has an enlarged hexagonal head 73 thereon and the lower end of the rod has a square recess 74 therein. Connecting the rod 71 and the rod 37 I provide an operating rod 75 which at the upper end has a square portion 76 which is positioned in the recess 74 of the rod 71. The opposite end of the rod 75 includes an enlarged portion 76' having a squared recess 77 therein which engages squared portion 37' of the rod 37.

Adjacent the ground line the rod 75 may be provided with a groove 78 so that in case the fire hydrant portion 12 should become broken off the rod 75 would break at the point 78 and prevent damage being done to the rod 37.

In the cap 34 I provide opposed recesses 80 which adjacent each side thereof toward the center include an overhanging lip portion 81. A wrench member 82 which is shown in detail in Fig. 7 includes a pair of spaced prongs 83 which have at their lower ends inwardly directed finger portions 84. The prongs 83 of the wrench are adapted to be positioned in the recess 80 of the cap member 34 and by rotating the wrench in either direction the finger portions 84 of the wrench become positioned under the lip portions 81 of the cap.

In operation when it is desired to admit water from the inlet pipe 63 into the members 12 and 13 of the hydrant the operator rotates the rod 71 by a suitable wrench member (not shown) which engages the hexagonal head 73 thereof. When the rod 71 is rotated it rotates the rod 75 which in turn rotates the rod 37. As the rod 37 is rotated the threaded portion 43 thereof forces the stem 48 to move upwardly which in turn moves the valve plate 56 out of engagement with its associated seat 33 whereupon fluid passes through the valve seat member 31 into the housing 26 and out and from therethrough the apertures 58 into the member 13 thence into the member 12 from which it may be withdrawn through the outlet members 17.

To close the valve 56 the rod 37 is rotated in the opposite direction whereupon the threaded portion 43 thereof causes the stem 48 to move downwardly thereby moving the valve 56 into engagement with its associated seat 37. Should any portion of the valve mechanism 25 become defective the operator removes the cap 15 and the rod 75. The wrench 82 is then lowered into engagement with the cap 34 with the prongs 83 thereof positioned in the cap apertures 81. The operator then rotates the wrench 82 thereby disengaging the threads 27 of the member 25 from the threads 23 of the member 13. As the member 25 moves upwardly the spring 69 forces the plate 65 to swing upwardly following the lower end of the portion 28 of the device 25. As the device 25 is removed the valve plate 65 engages valve seat 63 of the device 14 thereby preventing passage of water through the outlet 62. When the device 25 is replaced the lower end 28 thereof engages the valve plate 65 and as the device 25 moves downwardly the lower end 28 thereof forces the valve plate 65 downward against the action of the spring 69.

Having thus described my invention I claim:

1. A fire hydrant, said fire hydrant including a hollow upper portion, a hollow intermediate portion and a hollow lower portion, said upper portion having a plurality of outlet members thereon, said lower portion having an inlet aperture and an outlet aperture, a valve device including a housing engaging said intermediate portion, said valve housing having a reduced lower end projecting through said outlet aperture of said lower portion, a valve plate member, mounted on said lower portion, said lower portion including a valve seat surrounding said outlet aperture adapted to be engaged by said valve plate, said valve housing having a recess therein opening into said lower portion, a valve seat portion positioned in said recess, a closure valve adapted to engage said valve seat, said valve housing above said valve seat including a plurality of apertures opening into said intermediate portion and means on said lower projecting end to move said valve plate member out of engagement with its associated valve seat.

2. A fire hydrant, said fire hydrant including a hollow upper portion, a hollow intermediate portion and a hollow lower portion, said upper portion having a plurality of outlet members thereon, said lower portion having an inlet aperture and an outlet aperture, a valve device including a housing having a threaded portion thereon removably engaging a threaded portion of said intermediate portion, said valve housing having a reduced lower end projecting through said outlet aperture of said lower portion, a valve plate member, said valve plate member being pivotally mounted on said lower portion, said lower portion including a valve seat surrounding said outlet aperture adapted to be engaged by said valve plate, resilient means normally urging said valve plate toward said valve seat, said reduced lower end of said valve housing engaging said valve plate and retaining it out of engagement with said valve seat when said valve housing is operatively positioned in said intermediate portion, said valve housing having a recess therein opening into said lower portion, a valve seat portion positioned in said recess, a closure valve adapted to engage said valve seat, said valve housing above said valve seat including a plurality of apertures opening into said intermediate portion and means to move said closure valve member into or out of engagement with its associated valve seat.

3. A fire hydrant, said fire hydrant including hollow upper, intermediate and lower portions, said upper portion having an outlet, said lower portion having an inlet aperture and an outlet aperture, a valve device including a housing removably engaging said intermediate portion, said valve housing having a reduced lower end projecting through said outlet aperture of said lower portion, a valve plate member, said valve plate member being pivotally mounted on said lower portion, said lower portion including a valve seat surrounding said outlet aperture adapted to be engaged by said valve plate, means to retain said valve plate out of engagement with said valve seat when said valve housing is operatively positioned in said intermediate portion, said valve housing having a recess therein opening into said lower portion, a removable valve seat portion positioned in said recess, a closure valve adapted to engage said removable valve seat, said valve housing above said valve seat including an aperture opening into said intermediate portion, said closure valve including a stem portion, said stem portion having a threaded recess therein, a rod member having a threaded portion thereon engaging said threaded recess of said stem and an operating rod, said operating rod engaging said first rod whereby when said operating rod is rotated said stem is moved.

4. A fire hydrant, said fire hydrant including a hollow body portion, a hollow intermediate portion and a hollow lower body, said body having a plurality of outlet members thereon, and an inlet aperture, a valve device in said body intermediate said inlet and outlets, said valve device including a housing removably secured to said body, said valve housing having a reduced lower end, a valve plate member, said valve plate member being pivotally mounted in said lower body intermediate said valve housing and said inlet, a valve seat adapted to be engaged by said valve plate, means normally urging said valve plate toward said valve seat, said reduced lower end of said valve housing engaging said valve plate and retaining it out of engagement with said valve seat when said valve housing is operatively positioned in said body, said valve housing having an aperture therein opening into said body below said valve housing, a valve seat portion surrounding said valve housing aperture, a closure valve adapted to engage said valve seat portion, said valve housing above said valve seat portion including an aperture opening into said body, said closure valve including a stem portion, said stem portion having a threaded recess therein, a threaded rod member engaging said threaded recess of said stem, an operating rod, said operating rod engaging said first rod, a cap member on said body and having an aperture therein, a rod member positioned in said cap member aperture, said third rod engaging said second rod whereby when said third rod is rotated said second rod will be rotated and will in turn rotate said first rod whereby said threaded portion of said first rod causes said stem to move said closure valve member either into or out of engagement with its associated valve seat.

5. A fire hydrant, said fire hydrant comprising a hollow body portion having an inlet and an outlet, a valve seat in said body, a valve associated with said seat and movable to either a closed or open position, a second valve seat having a valve coacting therewith and positioned in said body intermediate said first valve and said inlet, said second valve being mounted to normally move to a closed position and means independent of said first valve whereby said first valve seat retains said second valve member in an open position.

6. A fire hydrant, said fire hydrant including a hollow body portion, having an outlet thereon and an inlet, a valve device in said body intermediate said inlet and said outlet, said valve device including a housing removably secured to said body, a valve pivotally mounted in said body intermediate said valve housing and said inlet, a valve seat adapted to be engaged by said valve and means rigid on said valve housing to normally hold said valve from its seat.

7. A fire hydrant including a hollow body having an outlet for water thereon, said body including a lower portion having an aperture therein, said body above said aperture having a threaded portion, a cylindrical housing having its lower end threadedly engaging said threaded portion, said housing having an aperture therein opening into said body, a valve seat portion surrounding said valve housing aperture inlet, a closure valve adapted to engage said valve seat, said valve housing above said valve seat including an aperture opening into said body, said closure valve including a stem portion, a rod member engaging said stem, an operating rod, said operating rod engaging said first rod, said cap member of said body having an aperture therein, a rod member positioned in said aperture, said rod having an enlarged head thereon, said third rod engaging said second rod whereby when said third rod is rotated said second rod will be rotated and will in turn rotate said first rod whereby said threaded portion of said first rod causes said stem to move said closure valve member either into or out of engagement with its associated valve seat.

8. A fire hydrant including a hollow body having an outlet for water thereon, said body including a lower portion having an aperture therein and having an annular downwardly facing valve seat surrounding said aperture, a valve mounted on a shaft disposed at one side of said aperture and movable to engage the valve seat and close passage through the aperture, said body above said aperture having a threaded portion, a cylindrical housing having its lower end threadedly engaging said threaded portion, said housing including a lower reduced portion normally extending below said valve seat and engaging said valve to hold said valve away from its seat, said valve housing having an aperture therein opening into said body below said valve housing, a valve seat portion surrounding said valve housing aperture, a closure valve adapted to engage said valve seat portion, said valve housing above said valve seat portion including an aperture opening into said body, said closure valve including a stem portion, a rod member engaging said stem, an operating rod, said operating rod engaging said first rod, a cap member on said body and having an aperture therein, a rod member positioned in said cap member aperture, said rod having an enlarged head thereon, said third rod engaging said second rod whereby when said third rod is rotated said second rod will be rotated and will in turn rotate said first rod whereby said threaded portion of said first rod causes said stem to move said closure valve member either into or out of engagement with its associated valve seat.

9. A fire hydrant, said fire hydrant including hollow upper, intermediate and lower portions, said upper portion having an outlet member thereon, said lower portion having an inlet aperture and an outlet aperture, a valve device including a housing engaging said intermediate portion, said valve housing having a reduced lower end projecting through said outlet aperture of said lower portion, a valve plate member mounted on said lower portion and including a valve seat surrounding said outlet aperture and adapted to be engaged by said valve plate, said valve housing having a recess therein opening into said lower portion, a removable valve seat portion positioned in said recess, a closure valve adapted to engage said removable valve seat, said valve housing above said valve seat including an aperture opening into said intermediate portion, said valve housing having a transverse partition therein above said outlet aperture thereof and said partition including a boss portion, an aperture in said boss, said closure valve including a stem portion, said stem portion having a recess therein and being positioned in said recess of said boss, means to prevent rotation of said stem, a rod member having a threaded portion thereon engaging said recess of said stem, said valve housing having an apertured cap member thereon, said rod member being positioned in said cap aperture, an operating rod, said operating rod engaging said first rod, said cap member of said upper portion having an aperture therein, a rod member positioned in said aperture, said last mentioned rod engaging said second rod whereby when said third rod is rotated said second rod will be rotated and will in turn rotate said first rod whereby said threaded portion of said first rod causes said stem to move said closure valve member.

HARRY J. McCOMBS BURDICK.